US012412133B2

(12) United States Patent
Lin et al.

(10) Patent No.: US 12,412,133 B2
(45) Date of Patent: Sep. 9, 2025

(54) ENTITY RELATION STRENGTH IDENTIFICATION USING SPATIOTEMPORAL DATA

(71) Applicant: C3.ai, Inc., Redwood City, CA (US)

(72) Inventors: Chih-Hsu Lin, Belmont, CA (US); Franklin Q. Ye, San Francisco, CA (US); Romain F. Juban, Half Moon Bay, CA (US); Bryan C. Anderson, Carnation, WA (US)

(73) Assignee: C3.AI, Inc., Redwood City, CA (US)

( * ) Notice: Subject to any disclaimer, the term of this patent is extended or adjusted under 35 U.S.C. 154(b) by 403 days.

(21) Appl. No.: 17/655,740

(22) Filed: Mar. 21, 2022

(65) Prior Publication Data

US 2023/0297901 A1 Sep. 21, 2023

(51) Int. Cl.
*G06Q 10/063* (2023.01)
(52) U.S. Cl.
CPC .................... *G06Q 10/063* (2013.01)
(58) Field of Classification Search
CPC ............... G06Q 10/063; G06Q 10/067
See application file for complete search history.

(56) References Cited

U.S. PATENT DOCUMENTS

| | | | | |
|---|---|---|---|---|
| 11,620,338 B1* | 4/2023 | Bullard | ............... | G06F 16/287 707/798 |
| 2005/0075917 A1* | 4/2005 | Flores | ............... | G06Q 10/06 705/7.11 |
| 2010/0146118 A1* | 6/2010 | Wie | ............... | G06Q 10/10 709/227 |
| 2014/0019533 A1* | 1/2014 | Sherman | ............... | G06Q 10/10 709/204 |
| 2014/0074545 A1* | 3/2014 | Minder | ............... | G06Q 10/0633 705/7.27 |
| 2017/0111462 A1 | 4/2017 | Oberli et al. | | |
| 2017/0236081 A1* | 8/2017 | Grady Smith | ............... | G06Q 10/0637 705/7.36 |
| 2017/0255868 A1 | 9/2017 | Gelinas et al. | | |

(Continued)

FOREIGN PATENT DOCUMENTS

WO WO-2020167316 A1 * 8/2020

OTHER PUBLICATIONS

Hanson, "Using Scikit-learn's Binary Trees to Efficiently Find Latitude and Longitude Neighbors," Towards Data Science, Sep. 2020, 3 pages.

(Continued)

*Primary Examiner* — William S Brockington, III
(74) *Attorney, Agent, or Firm* — Davis Wright Tremaine LLP (57) ABSTRACT

A method includes obtaining information associated with multiple collocation events. Each collocation event is associated with an occurrence where multiple entities were collocated with one another. The information associated with each collocation event identifies the entities associated with the collocation event, a duration of the collocation event, one or more locations associated with the collocation event, and a time associated with the collocation event. The method also includes identifying strengths of different relationships involving different ones of the entities based on the information. The strengths are determined using one or more features of the collocation events.

37 Claims, 7 Drawing Sheets

(56) References Cited

U.S. PATENT DOCUMENTS

2019/0130359 A1\* 5/2019 Sterczyk ............. G06Q 10/105
2020/0104337 A1   4/2020 Kelly et al.
2020/0364588 A1\* 11/2020 Knox .................... G06V 40/20
2021/0065201 A1\* 3/2021 Hudson ................ G06F 16/284

OTHER PUBLICATIONS

International Search Report and Written Opinion of the International Searching Authority dated Sep. 27, 2023 in connection with International Patent Application No. PCT/US23/63597, 8 pages.

\* cited by examiner

ENTITY RELATION STRENGTH IDENTIFICATION USING SPATIOTEMPORAL DATA

TECHNICAL FIELD

This disclosure is generally directed to data processing systems. More specifically, this disclosure is directed to entity relation strength identification using spatiotemporal data.

BACKGROUND

Various applications involve attempting to determine whether two or more entities (such as two or more people) have some type of relationship with one another. For example, business networking applications may attempt to determine whether various business professionals are familiar with one another and meet one another from time to time. As another example, intelligence applications may attempt to determine who various surveillance targets interact with, how often they interact, and when and where they interact. Often times, these types of applications rely on rules-based queries to extract information that is collected from specific sources of information.

SUMMARY

This disclosure relates to entity relation strength identification using spatiotemporal data.

In a first embodiment, a method includes obtaining information associated with multiple collocation events. Each collocation event is associated with an occurrence where multiple entities were collocated with one another. The information associated with each collocation event identifies the entities associated with the collocation event, a duration of the collocation event, one or more locations associated with the collocation event, and a time associated with the collocation event. The method also includes identifying strengths of different relationships involving different ones of the entities based on the information. The strengths are determined using one or more features of the collocation events.

In a second embodiment, an apparatus includes at least one processing device configured to obtain information associated with multiple collocation events. Each collocation event is associated with an occurrence where multiple entities were collocated with one another. The information associated with each collocation event identifies the entities associated with the collocation event, a duration of the collocation event, one or more locations associated with the collocation event, and a time associated with the collocation event. The at least one processing device is also configured to identify strengths of different relationships involving different ones of the entities based on the information. The strengths are based on one or more features of the collocation events.

In a third embodiment, a non-transitory computer readable medium stores computer readable program code that when executed causes one or more processors to obtain information associated with multiple collocation events. Each collocation event is associated with an occurrence where multiple entities were collocated with one another. The information associated with each collocation event identifies the entities associated with the collocation event, a duration of the collocation event, one or more locations associated with the collocation event, and a time associated with the collocation event. The medium also stores computer readable program code that when executed causes the one or more processors to identify strengths of different relationships involving different ones of the entities based on the information. The strengths are based on one or more features of the collocation events.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 8, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, various applications involve attempting to determine whether two or more entities (such as two or more people) have some type of relationship with one another. For example, business networking applications may attempt to determine whether various business professionals are familiar with one another and meet one another from time to time. As another example, intelligence applications may attempt to determine who various surveillance targets interact with, how often they interact, and when and where they interact. Often times, these types of applications rely on rules-based queries to extract information that is collected from specific sources of information.

Unfortunately, conventional approaches for identifying relationships involving entities can suffer from various shortcomings. For example, rules-based queries are typically slow, require manual effort, and do not scale well as the amount of data to be processed increases. Also, it is generally difficult to automate and scale correlations of multiple data streams, and it is often difficult to integrate new sources of data into these approaches. Further, while these approaches may be able to identify whether certain entities have relationships, these approaches cannot quantify the strengths of those relationships. The strengths of relationships may be useful in various scenarios, such as when large datasets of many relations are being processed.

This disclosure provides for entity relation strength identification using spatiotemporal data. As described in more detail below, collocation events can be obtained, such as based on information from one or more data sources. Each collocation event identifies an event or occurrence where multiple entities were collocated with one another. For example, each collocation event may identify an occurrence where two or more entities were at or near a common location, such as within a threshold distance of each other, for at least a threshold amount of time or for any amount of time. In some embodiments, each collocation event may identify the entities involved in the event, a duration of the event, one or more locations (such as a latitude and a longitude or other location information for the entities or for a related point) associated with the event, and a time (such as a start time and/or an end time and a date or other time-based information) of the event. The collocation events therefore represent spatiotemporal data, meaning data associated with both various locations and various times. A wide variety of data sources may be used here to obtain information used to generate or otherwise obtain collocation events, and data sources can be added and removed as needed.

The collocation events are processed to identify relationships involving entities and strengths of those relationships. For example, to process the collocation events, various features may be identified using the collocation events, and these features may be subsequently processed to identify the relationships involving the entities and the strengths of those relationships. Any suitable features of the collocation events may be identified and used here. Examples of collocation event features that may be identified and processed could include the numbers of events (event frequencies) involving different entities, proximities or distances between or among entities during the events, and durations of the events. Depending on the implementation, these features may be determined for a single period of time or for multiple periods of time. Examples of timeframes that may be used here could include seven days, thirty days, and/or ninety days. The identified collocation event features can also be scaled so that the feature values of those event features are expressed relative to a common scale or range, which can facilitate more effective aggregation of the identified collocation event features.

The identified collocation event features may be processed in any suitable manner to identify the relationships involving the entities and the strengths of those relationships. For example, the features may be weighted differently and combined or otherwise processed, used as inputs to one or more machine learning models, analyzed using one or more statistical techniques, or used in any other suitable manner. The results of the feature analysis or analyses may include relationship scores, which can be used as indicators of both (i) identified relationships involving specified entities and (ii) the strengths of the identified relationships. Since the analysis can be repeated over time (such as daily), this can allow sequences of relationship scores to be determined for different entities over time.

The ability to identify the strengths of relationships that are determined using spatiotemporal data can help to provide more effective differentiation of various types of relationships among entities and provide better resolution of those entities' relationships. The quantified relationships can also enable various downstream processing tasks, such as identifying key related entities given a specific entity of interest. In other words, a downstream processing task may be configured to identify, for a specific identified entity, which other entity or entities have key or strongest relationships with the specific identified entity. As a particular example, the quantified relationships can be used as input features into one or more machine learning models that are used in downstream processing tasks.

Figure 1:
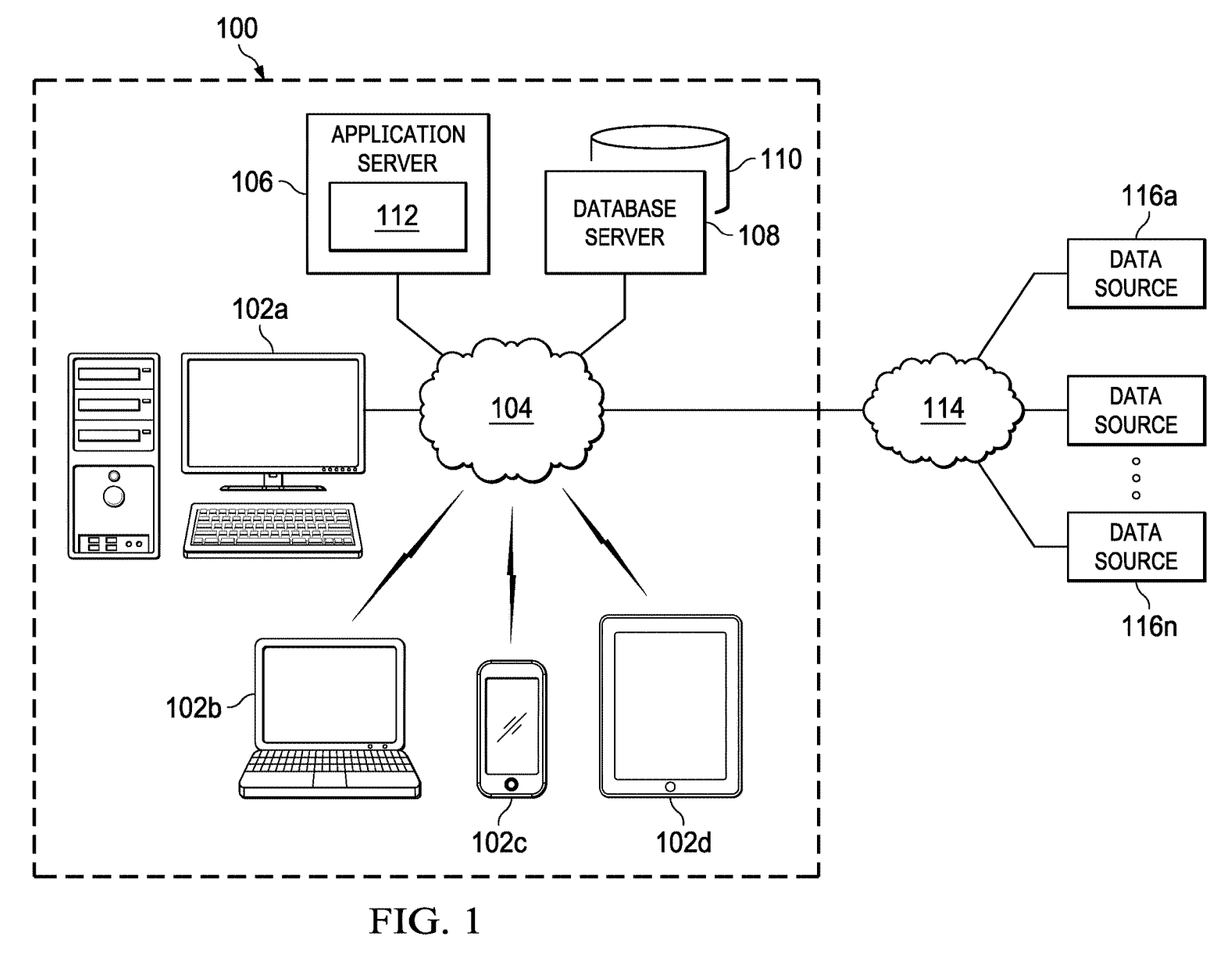
FIG. 1 illustrates an example system supporting entity relation strength identification using spatiotemporal data according to this disclosure.

FIG. 1 illustrates an example system 100 supporting entity relation strength identification using spatiotemporal data according to this disclosure. For example, the system 100 shown here may be used to identify relationships involving entities and the strengths of those relationships as described in more detail below. As shown in FIG. 1, the system 100 includes user devices 102a-102d, one or more networks 104, one or more application servers 106, and one or more database servers 108 associated with one or more databases 110. Each user device 102a-102d communicates over the network 104, such as via a wired or wireless connection. Each user device 102a-102d represents any suitable device or system used by at least one user to provide or receive information, such as a desktop computer, a laptop computer, a smartphone, and a tablet computer. However, any other or additional types of user devices may be used in the system 100.

The network 104 facilitates communication between various components of the system 100. For example, the network 104 may communicate Internet Protocol (IP) packets, frame relay frames, Asynchronous Transfer Mode (ATM) cells, or other suitable information between network addresses. The network 104 may include one or more local area networks (LANs), metropolitan area networks (MANs), wide area networks (WANs), all or a portion of a global network such as the Internet, or any other communication system or systems at one or more locations. In some cases, the network 104 may represent a private or internal network used by an organization that is processing data for entity relation strength identification.

The application server 106 is coupled to the network 104 and is coupled to or otherwise communicates with the database server 108. The application server 106 performs various operations to support entity relation strength identification using spatiotemporal data. For example, the application server 106 may execute one or more applications 112, which can be used to implement the techniques for entity relation strength identification. The one or more applications 112 here can use data from and/or store data in the database 110 via the database server 108 during operation. Note that the database server 108 may also be used within the application server 106 to store information, in which case the application server 106 itself may store the information used to support entity relation strength identification. The results of the entity relation strength identification operations may be used in any suitable manner. For instance, identified relationships involving entities and strengths of the relationships (or information based thereon) may be presented to one or more users, such as via one or more user devices 102a-102d.

The database server 108 operates to store and facilitate retrieval of various information used, generated, or collected by the application server 106 and the user devices 102a-102d in the database 110. For example, the database server 108 may store various information used to identify the relationships involving entities and the strengths of those relationships. At least some of the data used to perform the entity relation strength identification operations may be obtained via one or more external networks 114, such as the Internet. For instance, one or more external data sources 116a-116n may be coupled to or otherwise communicate over the one or more external networks 114 and provide information to the application server 106 for use and/or to the database server 108 for storage in the database 110. The one or more external data sources 116a-116n may include any suitable number(s) and type(s) of data source(s) used for entity relation strength identification, such as any suitable source of spatiotemporal data related to one or multiple entities.

Although FIG. 1 illustrates one example of a system 100 supporting entity relation strength identification using spatiotemporal data, various changes may be made to FIG. 1. For example, the system 100 may include any number of user devices 102a-102d, networks 104, 114, application servers 106, database servers 108, databases 110, and data sources 116a-116n. Also, these components may be located in any suitable locations and might be distributed over a large area. In addition, while FIG. 1 illustrates one example operational environment in which entity relation strength identification may be used, this functionality may be used in any other suitable system.

Figure 2:
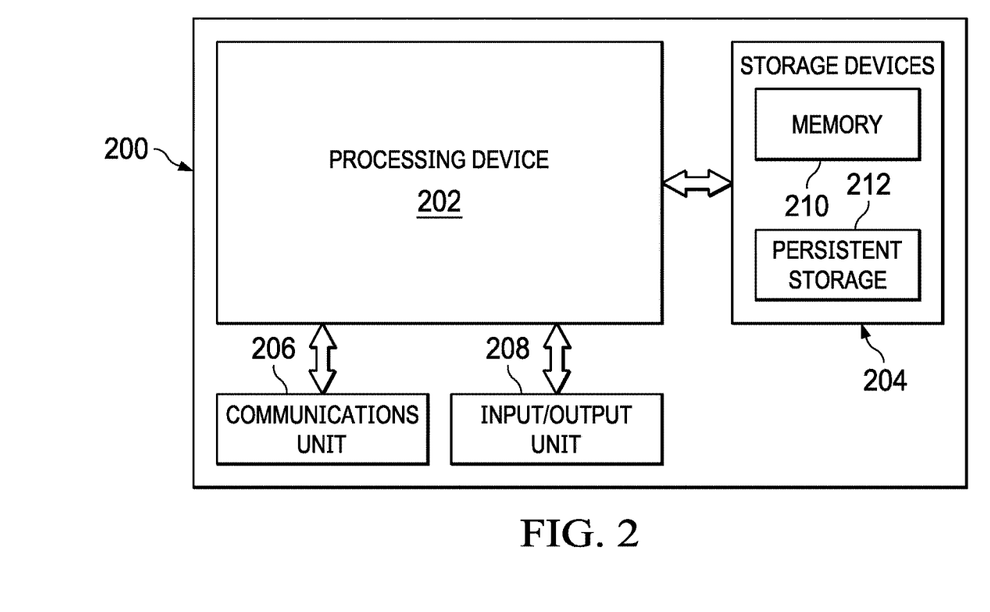
FIG. 2 illustrates an example device supporting entity relation strength identification using spatiotemporal data according to this disclosure.

FIG. 2 illustrates an example device 200 supporting entity relation strength identification using spatiotemporal data according to this disclosure. One or more instances of the device 200 may, for example, be used to at least partially implement the functionality of the application server 106 of FIG. 1. However, the functionality of the application server 106 may be implemented in any other suitable manner. In some embodiments, the device 200 shown in FIG. 2 may form at least part of a user device 102a-102d, application server 106, or database server 108 in FIG. 1. However, each of these components may be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other processing devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include a network interface card or a wireless transceiver facilitating communications over a wired or wireless network, such as the network 104 or 114. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the I/O unit 208 may be omitted if the device 200 does not require local I/O, such as when the device 200 represents a server or other device that can be accessed remotely.

Although FIG. 2 illustrates one example of a device 200 supporting entity relation strength identification using spatiotemporal data, various changes may be made to FIG. 2. For example, computing and communication devices and systems come in a wide variety of configurations, and FIG. 2 does not limit this disclosure to any particular computing or communication device or system.

Figure 3:
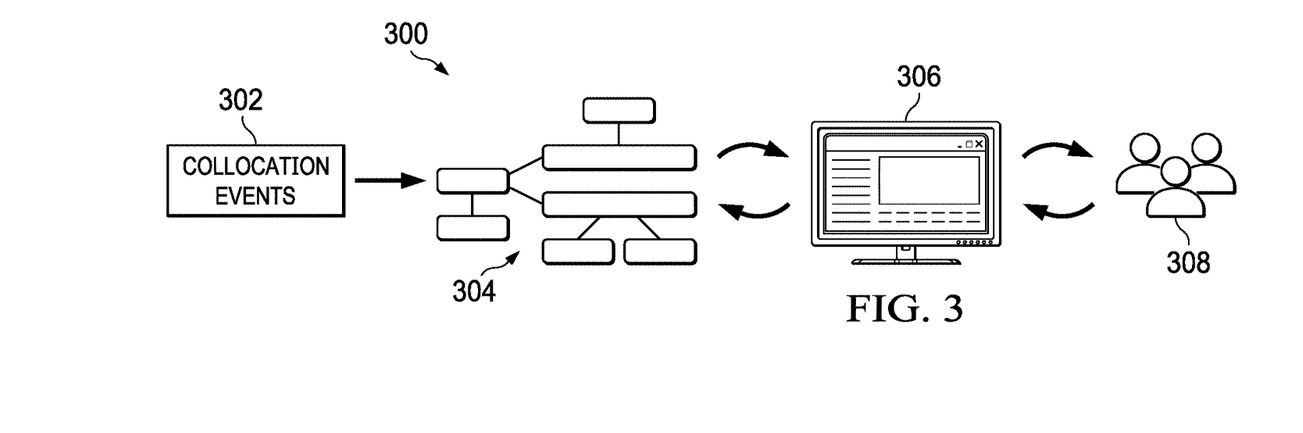
FIG. 3 illustrates an example architecture supporting entity relation strength identification using spatiotemporal data according to this disclosure.

FIG. 3 illustrates an example architecture 300 supporting entity relation strength identification using spatiotemporal data according to this disclosure. For ease of explanation, the architecture 300 shown in FIG. 3 is described as being implemented on or supported by the application server 106 in the system 100 shown in FIG. 1, where the application server 106 may be implemented using one or more instances of the device 200 shown in FIG. 2. However, the architecture 300 shown in FIG. 3 could be implemented on or supported by any other suitable device(s) and in any other suitable system(s).

As shown in FIG. 3, the architecture 300 generally operates to receive and process spatiotemporal data in the form of collocation events 302. The collocation events 302 may be obtained in any suitable manner, such as from one or more data sources 116a-116n. Each collocation event 302 identifies an occurrence in which multiple entities were collocated with one another, such as when two or more entities were within a threshold distance of each other for at least a threshold amount of time or for any amount of time. In some embodiments, each collocation event 302 may include information identifying the entities involved in the event, a duration of the event, one or more locations (such as a latitude and a longitude or other location information for the entities or for a related point) associated with the event, and a time (such as a start time and/or an end time and a date or other time-based information) of the event. Note that collocation events 302 associated with entities may represent data associated with the entities themselves and/or data associated with mobile devices (such as mobile smartphones or laptop/tablet computers) or other devices (such as vehicles) associated with the entities. Also note that the location(s) may represent the locations of the entities themselves or of their devices or a related location, such as a point between or close to the entities or a point around which the entities are located.

In some embodiments, the collocation events 302 may be obtained via an API or other interface 304 and processed into a unified data format. The unified data format may represent a predefined format in which the collocation events 302 can be placed. As a particular example, the unified data format may use a specified data structure that includes fields for information such as entity identification, location(s) (like a latitude and a longitude or other location information) of the event, and a time (like a start time and/or an end time and a date or other time-based information) of the event, and duration. Any suitable interface 304 may be used here to obtain the collocation events 302.

Data processing operations 306 are performed to analyze the collocation events 302 in order to perform entity relation strength identification operations. Examples of how the data processing operations 306 may be performed to identify relationships and relationship strengths are provided below. The results of the data processing operations 306 may be used in any suitable manner. In this specific example, the processing results (or information based on the processing results) can be provided to one or more analysts 308. As a particular example, the results of the data processing operations 306 may be provided via at least one graphical user interface presented by one or more user devices 102a-102d used by the analyst(s) 308.

Note that the functions shown in or described with respect to FIG. 3 can be implemented in an electronic device, such as a computing device, in any suitable manner. For example, in some embodiments, at least some of the functions shown in or described with respect to FIG. 3 can be implemented or supported using one or more software applications or other software instructions that are executed by one or more processing devices of an application server 106, device 200, or other device. In other embodiments, at least some of the functions shown in or described with respect to FIG. 3 can be implemented or supported using dedicated hardware components. In general, the functions shown in or described with respect to FIG. 3 can be performed using any suitable hardware or any suitable combination of hardware and software/firmware instructions.

Although FIG. 3 illustrates one example of an architecture 300 supporting entity relation strength identification using spatiotemporal data, various changes may be made to FIG. 3. For example, identified relationships or relationship strengths may be used in any suitable manner.

FIGS. 4 through 7 illustrate an example technique for entity relation strength identification using spatiotemporal data according to this disclosure. For ease of explanation, the technique shown in FIGS. 4 through 7 is described as being performed by the application server 106 in the system 100 shown in FIG. 1, where the application server 106 may be implemented using one or more instances of the device 200 shown in FIG. 2. As a particular example, the technique shown in FIGS. 4 through 7 may be implemented as part of the data processing operations 306 within the architecture 300 shown in FIG. 3. However, the technique shown in FIGS. 4 through 7 could be performed by any other suitable device(s) and in any other suitable system(s).

Figure 4:
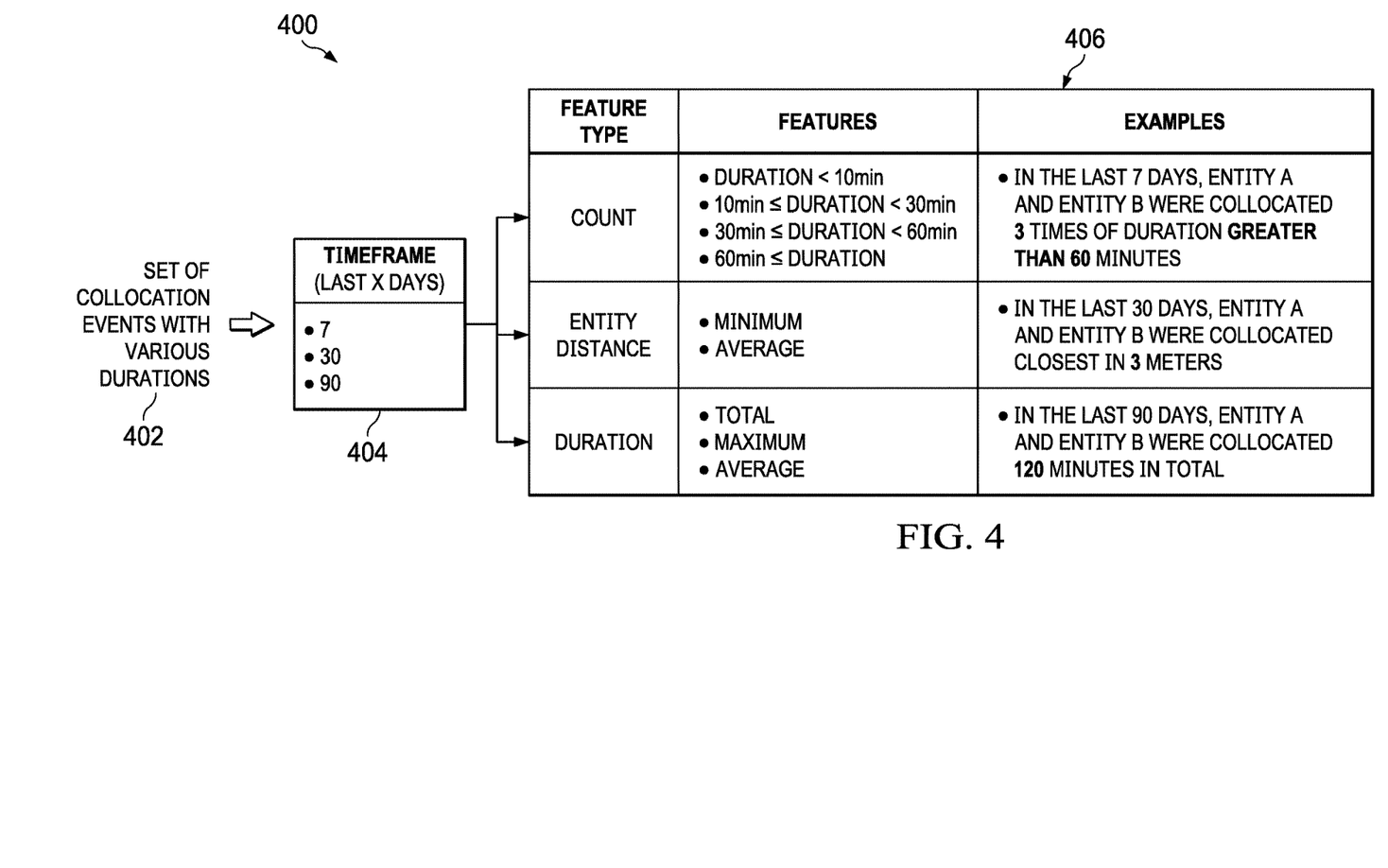
FIGS. 4 through 7 illustrate an example technique for entity relation strength identification using spatiotemporal data according to this disclosure.

As shown in FIG. 4, a feature identification process 400 obtains input data 402 in the form of collocation events. The collocation events in the input data 402 can include events that involve any suitable number of entities and that occur over any suitable range of locations. The collocation events in the input data 402 can also include events of various durations, and the collocation events in the input data 402 may span any suitable period of time. As a particular example, the collocation events in the input data 402 may represent the collocation events 302 described above.

The events in the input data 402 may be divided into or otherwise associated with one or more timeframes 404. In this example, there are three timeframes 404 used, namely seven days, thirty days, and ninety days. Thus, events in the input data 402 that occurred within the last seven days may be placed within or otherwise associated with a first timeframe 404, events in the input data 402 that occurred within the last thirty days may be placed within or otherwise associated with a second timeframe 404, and events in the input data 402 that occurred within the last ninety days may be placed within or otherwise associated with a third timeframe 404. Thus, the same event may be included in multiple timeframes 404, and the number of events within each timeframe 404 will generally increase as the length of the timeframes 404 increases. Note, however, that the number and durations of the timeframes 404 shown here are for illustration only. In general, any suitable number of timeframes 404 may be used, and each timeframe 404 may be of any suitable duration. Also note that processing of collocation events can be repeatedly performed over time, so newer collocation events can be added to the timeframe(s) 404 and older collocation events can be dropped from the timeframe(s) 404 as time progresses.

For each timeframe 404, a collection of features 406 for the collocation events within or otherwise associated with that timeframe 404 may be generated. Any suitable features of the collocation events may be determined for each timeframe 404 here. In this particular example, the features 406 include count features, entity distance features, and duration features. In some embodiments, these features 406 may be determined for pairs of entities identified in the input data 402 as having been collocated with one another. In other cases, these features 406 may be determined for two or more entities identified in the input data 402 as having been collocated with one another. This process effectively "featurizes" the collocation events in the input data 402 by producing features 406 defining the collocation events.

In this example, each count feature 406 identifies (for two or more entities) the number of collocation events that involved those entities within a specified timeframe 404 and that had a specified duration or a duration that fell within a specific range. In this particular example, there are four count features 406, namely the number of collocation events in the timeframe 404 having a duration under a threshold (ten minutes), the number of collocation events in the timeframe 404 having a duration between two thresholds (ten minutes to thirty minutes), the number of collocation events in the timeframe 404 having a duration between two other thresholds (thirty minutes to sixty minutes), and the number of collocation events in the timeframe 404 having a duration above a threshold (sixty minutes). Note, however, that the number and type of count features and the thresholds associated with the count features 406 can vary as needed or desired.

Each entity distance feature 406 identifies (for two or more entities) a type of distance between or among those entities during collocation events involving those entities in the timeframe 404. In this particular example, there are two entity distance features 406, namely the minimum distance between or among multiple entities during collocation events involving those entities in the timeframe 404 and the average distance between or among those entities during collocation events involving those entities in the timeframe 404. Note, however, that the number and type of entity distance features 406 can vary as needed or desired.

Each duration feature 406 identifies (for two or more entities) a type of duration measurement associated with collocation events involving those entities in the timeframe 404. In this particular example, there are three duration features 406, namely the total duration of collocation events involving multiple entities in the timeframe 404, the maximum duration of a collocation event involving those entities in the timeframe 404, and the average duration of the collocation events involving those entities in the timeframe 404. Note, however, that the number and type of duration features 406 can vary as needed or desired.

Again, it should be noted that these features 406 can be determined for different combinations of entities (such as different pairs or groups of people) and for each timeframe 404 being used, and the features 406 can be calculated repeatedly over time (such as daily). As a result, these features 406 can be used to represent possible interactions of a large number of entities with one another over time. Also note that these features 406 may be determined in any suitable manner. In addition, it should be noted that the express identification of values for these features 406 may or may not occur in any given implementation. For example, in some embodiments, these features 406 may be expressly calculated and then processed as described below to identify entity relationships and relationship strengths. In other embodiments, the input data 402 itself (with or without division into timeframes 404) may be processed directly, such as by one or more machine learning models, and used to identify entity relationships and relationship strengths.

One common issue with calculated features 406 is that the features 406 often use different scales (such as frequencies or count numbers, distances, and times) and may use different numerical ranges to identify feature values. As a result, it can be difficult to aggregate the features 406 into a collection of values that can be processed together and used for identifying entity relationships and relationship strengths. For example, it may be difficult to weigh and combine features 406 or otherwise use features 406 having values that use different scales and that are expressed across different numerical ranges. Thus, feature values may optionally be pre-processed prior to further use in identifying entity relationships and relationship strengths.

Figure 5:
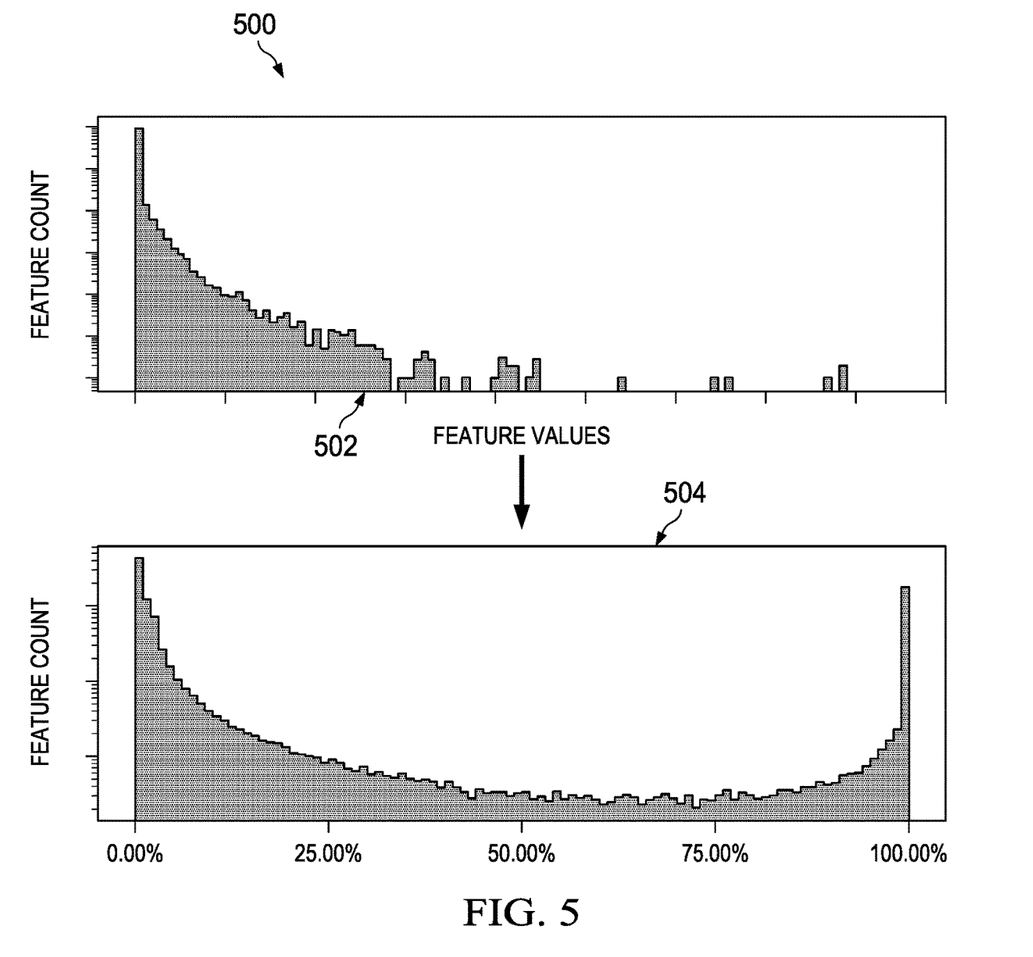

One example feature pre-processing technique is shown in FIG. 5, which illustrates that a scaling process 500 can take a set of feature values 502 as determined for one of the features 406 using one of the timeframes 404 and scale the feature values 502 to produce scaled feature values 504. The feature values 502 here are represented as a distribution in graph form, where the horizontal axis represents feature values and the vertical axis represents a count of the number of feature values 502 within the timeframe 404 having each value. The scaled feature values 504 here are also represented as a distribution in graph form, where the horizontal axis represents scaled feature values and the vertical axis represents a count of the number of feature values 502 within the timeframe 404 having each scaled value. The feature values 502 here are scaled to have values between zero and one (inclusive).

The function that is used to scale the feature values 502 of each feature 406 may be defined in any suitable manner to provide the desired scaling of those feature values 502 to a specified range. For example, a scaling function may be linear, non-linear, parametric, or non-parametric. Also, different scaling functions may be used for different features 406 when those features 406 use higher and lower values to indicate different levels of association. For example, some features 406 (such as count features and duration features) may indicate stronger associations involving entities when values of those features are higher and weaker associations involving entities when values of those features are lower. In contrast, other features 406 (such as entity distance features) may indicate stronger associations involving entities when values of those features are lower and weaker associations involving entities when values of those features are higher. Thus, the scaling that is applied for values 502 of each feature 406 can be designed to support an appropriate modification of those values 502. In some cases, the values 502 of all features 406 can be scaled so that higher values indicate stronger associations and lower values indicate weaker associations (or vice versa).

As a particular example of how scaling could be performed, it may be desirable to achieve improved resolution for a subset of feature values 502 related to one or more features 406. For example, it may be desirable to obtain improved resolution of the top 20% or other subset of feature values 502 for the count and duration features 406 and to obtain improved resolution of the bottom 20% or other subset of feature values 502 for the entity distance features 406. In these situations, the feature values 502 for the count and duration features 406 may be scaled so that the top 20% spans a wider range of values (since larger feature values 502 for these features 406 are most useful in identifying relationships and relationship strengths). Also, the feature values 502 for the entity distance features 406 may be scaled so that the bottom 20% spans a wider range of values (since smaller feature values 502 for those features 406 are most useful in identifying relationships and relationship strengths). In some embodiments, the scaling function applied to the feature values 502 of the count and duration features 406 or other features positively correlated with strength to produce the scaled feature values 504 may be defined as:

$$\text{Feature Score} = 1 - 0.2^{(\text{Feature Value}/80th)}$$

Here, Feature Value represents a feature value 502 being scaled, and Feature Score represents the scaled feature value 504 produced for that feature value 502. Also, $80^{th}$ represents a feature value 502 of the associated feature 406 at the $80^{th}$ percentile of that feature 406. Thus, this approach ensures that the bottom 80% of the feature values 502 for the count and duration features 406 occupy 20% of the scaled feature values 504, while the top 20% of the feature values 502 for the count and duration features 406 are spread over 80% of the scaled feature values 504. The scaling function used with the entity distance features 406 or other features negatively correlated with strength may be defined as the inverse of the scaling function defined above, which can be done to reorient the entity distance features 406 so that larger scaled feature values 504 indicate stronger associations. Thus, in some embodiments, the scaling function applied to the feature values 502 of the entity distance features 406 to produce the scaled feature values 504 may be defined as:

$$\text{Feature Score} = 0.2^{(\text{Feature Value}/80th)}$$

This allows the scaled feature values 504 for the entity distance features 406 to increase as entity distance decreases. Note, however, that these specific scaling functions are for illustration only and that other scaling functions may be used as needed or desired.

As described above, the feature values 502 and 504 shown in FIG. 5 may represent the values determined for one of the features 406 in FIG. 4 using the input data 402 associated with one timeframe 404. The process 500 shown in FIG. 5 may be repeated for each feature 406 determined for each timeframe 404 in order to scale all of the values 502 for each feature 406. Doing this for all features 406 can help to align the ranges of values for the features 406 and enable those features 406 to be combined or otherwise processed further to identify entity relationships and relationship strengths.

Again, it should be noted that the express scaling of the values 502 of the features 406 may or may not occur in any given implementation. For example, in some embodiments, the scaled feature values 504 may be expressly determined and then processed as described below to identify entity relationships and relationship strengths. In other embodiments, the input data 402 itself or the features 406 and their feature values 502 themselves may be processed directly, such as by one or more machine learning models, and used to identify entity relationships and relationship strengths.

Figure 6:
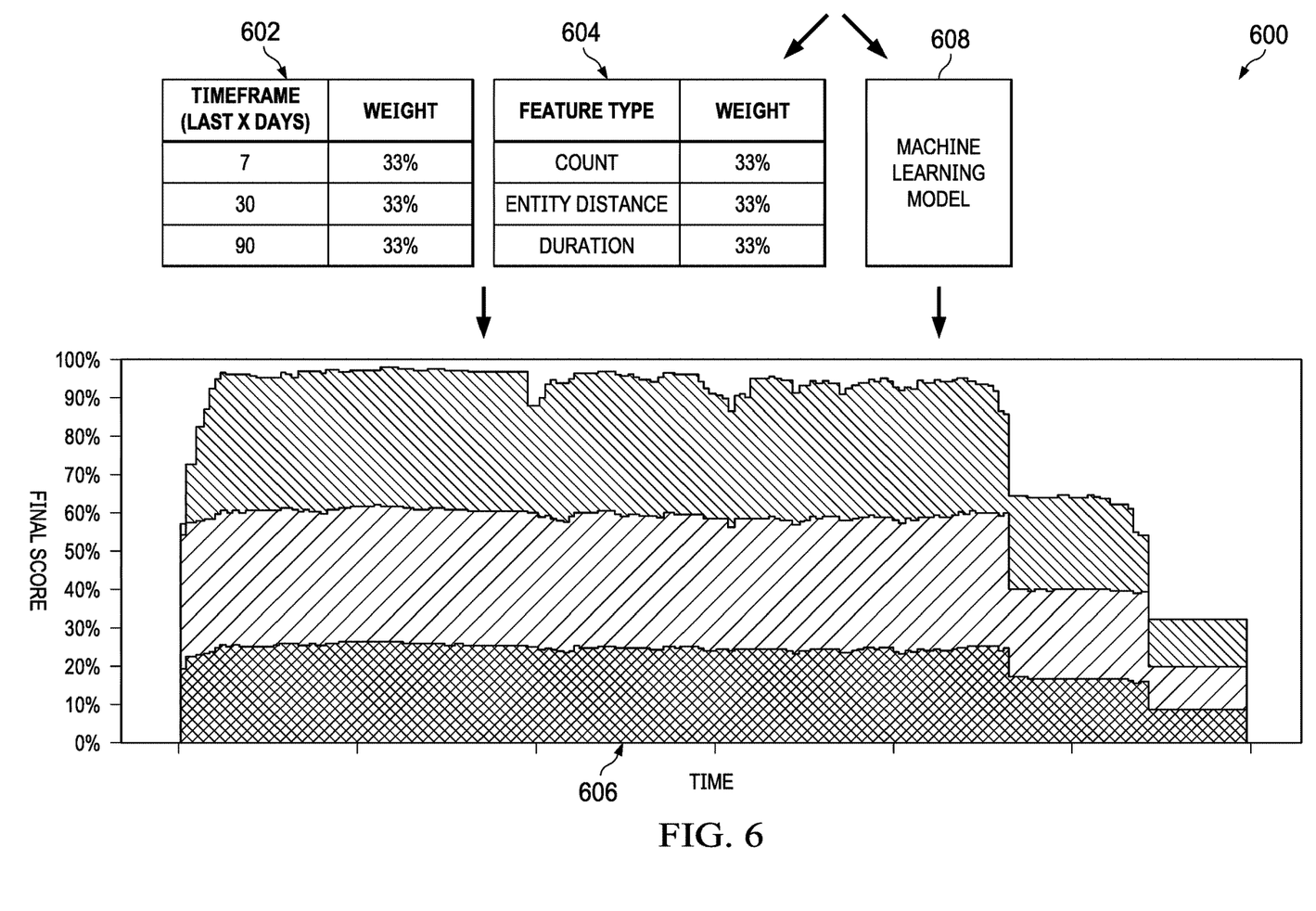

Once pre-processed or otherwise suitably obtained, the features 406 can be used to identify relationships and relationship strengths involving various entities. As noted above, there are various ways in which values of the features 406 can be used to identify relationships and relationship strengths. For example, the scaled feature values 504 may be weighted differently and combined or otherwise processed, used as inputs to one or more machine learning models, analyzed using one or more statistical techniques, or used in any other suitable manner. Several example approaches for using the scaled feature values 504 to identify relationships and relationship strengths are shown in FIG. 6, which illustrates an example feature analysis process 600.

In some embodiments, the feature analysis process 600 relies on determining weighted feature values in order to identify the strengths of relationships involving entities. For example, as shown in FIG. 6, different weights 602 can be defined for each of the timeframes 404, and/or different weights 604 can be defined for each of the different types of features 406. Note that these weights 602 and 604 are for illustration only and can vary as needed or desired. The weights 602 and 604 shown in FIG. 6 may be determined in any suitable manner. For instance, the weights 602 and 604 can be set manually or based on user configuration.

In this example, the scaled feature values 504 of the features 406 within each timeframe 404 can be weighted using the appropriate weights 602, and the scaled feature values 504 of the different types of features 406 within each timeframe 404 can also be weighted using the appropriate weights 604. After weighting, the weighted feature values can be summed, processed using a maximum, minimum, averaging, median, percentile, or other function, or otherwise used to produce final scores 606, which in this example are plotted in a graph. In this particular example, the final scores 606 for a pair or group of entities are plotted over time in the graph, where the total height of the plotted data for each day defines the total value of the final score 606 for that day. Larger final scores 606 can indicate stronger relationships, while smaller final scores 606 can indicate weaker relationships. The graph also illustrates how the different types of features 406 contribute to each final score 606. Of course, the final scores 606 may be determined or presented in any other suitable manner. Note that the final scores 606 in the graph here relate to a specific pair or group of entities, and final scores 606 may be similarly determined for each of multiple pairs or groups of entities.

In other embodiments, the final scores 606 may be determined directly without reference to explicit weights 602 and 604. For instance, one or more machine learning models 608 may be used to process the input data 402, the feature values 502 of the features 406, the scaled feature values 504 of the features 406, and/or other data in order to generate the final scores 606. In those embodiments, the one or more machine learning models 608 may be implemented in any suitable manner. For instance, one or more machine learning models 608 may be generated using semi-supervised learning and/or supervised learning with labeled training data, where the labeled training data is used to train the one or more machine learning models 608 to generate predictions (final scores 606) based on data provided to the model(s) 608. One or more machine learning models 608 may also be derived from an unsupervised approach, such as by using anomaly detection. The one or more machine learning models 608 may be used here to generate suitable final scores 606, and the final scores 606 may or may not identify the contributions of different types of features 406 to the final scores 606.

In still other embodiments, computations other than weighted processing can be used to generate the final scores 606. These computations may be used to process the input data 402, the feature values 502 of the features 406, the scaled feature values 504 of the features 406, and/or other data in order to generate the final scores 606. As a particular example, feature values 502 or 504 or other data may be processed using one or more statistical techniques, such as percentiles, z-scores, p-values, or mean absolute deviations of distributions, to identify the final scores 606. Again, the final scores 606 may or may not identify the contributions of different types of features 406 to the final scores 606.

In whatever manner the final scores 606 are determined, the final scores 606 here can be used as an indicator of (i) whether a relationship exists involving two or more entities and (ii) the strength of that relationship, if any. For example, smaller final scores 606 can be indicative of a lack of relationship involving entities or a weak relationship involving entities, while larger final scores 606 can be indicative of a stronger relationship involving entities. Moreover, because the final scores 606 can be determined over time, the final scores 606 can be used to measures trends over time, such as whether a relationship strengthens or weakens over time, is periodic, etc. In this way, the architecture 300 is able to provide a quantitative measure of the strengths of relationships involving various entities, which can be useful during various downstream processing tasks.

Figure 7:
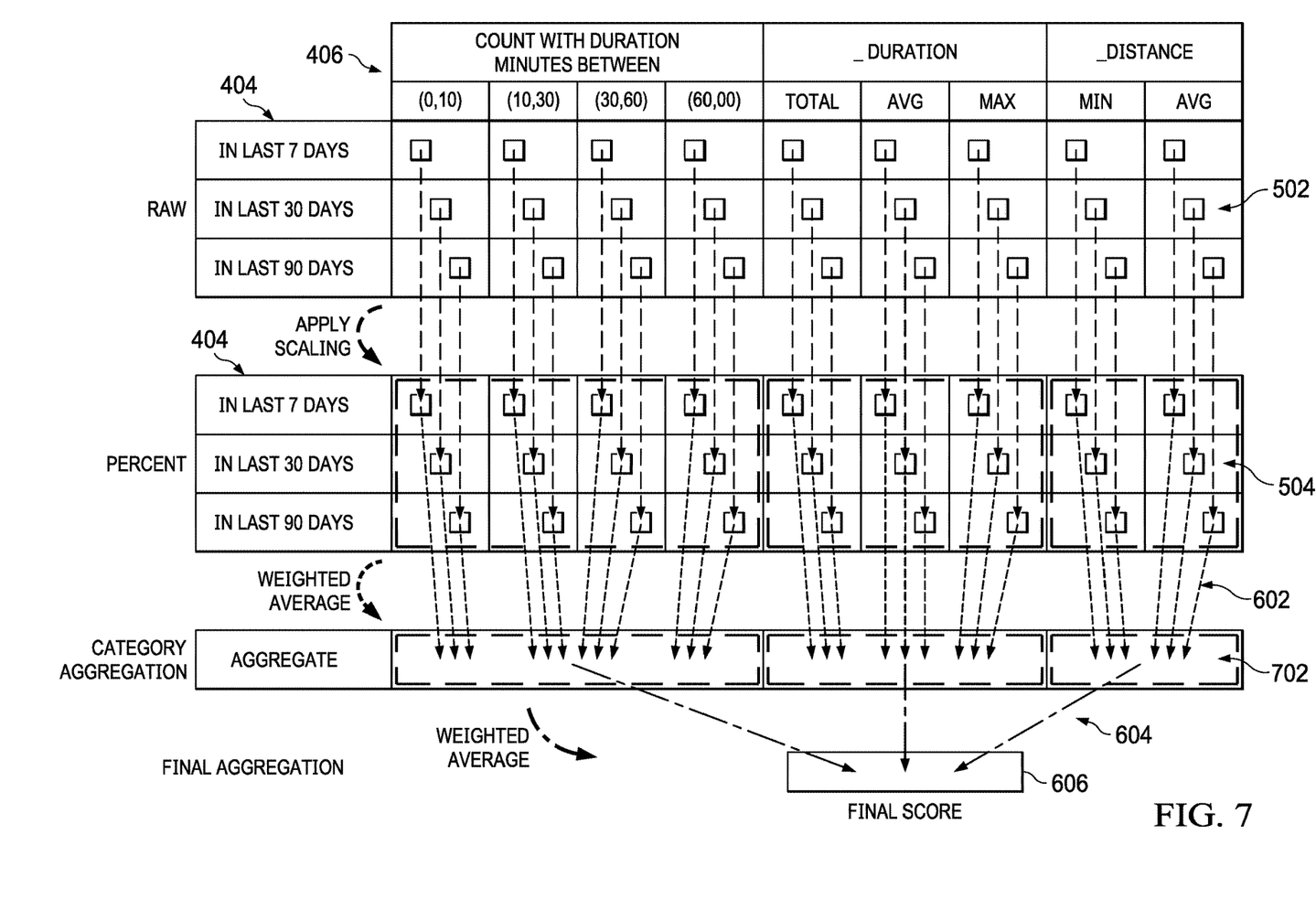

A summary of the process for generating the final scores 606 using weighted processing is shown in FIG. 7. As shown in FIG. 7, the feature values 502 can be generated for a number of features 406 within each of multiple timeframes 404. Scaling can be performed to convert the feature values 502 of the features 406 into scaled feature values 504. For instance, the scaled feature values 504 may be defined as percentages or other values within a scale ranging from zero to one. The weights 602 can be applied to the scaled feature values 504 in order to generate intermediate values 702, where each intermediate value 702 is determined by applying different weights 602 to the scaled feature values 504 in different timeframes 404. The weights 604 can be applied to the intermediate values 702 in order to generate the final score 606 for a specific pair or group of entities. This can be repeated for any number of pairs or groups of entities in order to identify the strengths of relationships involving those entities. Note that it is also possible to compute the final score 606 directly from the scaled feature values 504 using the weights 602 and 604 (without separately calculating the intermediate values 702). Also note that the final score 606 can be determined repeatedly over time in order to generate multiple final scores 606 identifying the strength of the relationship over time.

Although FIGS. 4 through 7 illustrate one example of a technique for entity relation strength identification using spatiotemporal data, various changes may be made to FIGS. 4 through 7. For example, the actual values used in FIGS. 4 through 7 (such as timeframes, durations, feature values, feature value distributions, weights, and final scores) can easily vary based on the implementation and the specific input data being processed. Also, the graphs shown here are for illustration and explanation only.

Note that while the embodiments using weighted processing of feature values have been described above as using common weights for all values of the same feature, it is possible to weight values of the same feature differently depending on the circumstances. For example, with respect to the event frequency features, it may be true that more frequent occurrences involving entities may be indicative of a relationship involving those entities. However, there may be some situations where that is not necessarily the case. As a particular example, two people who routinely visit the same coffee shop multiple times a week at around the same time each workday may simply represent two people who get coffee at the same location before going to work. However, two people who fly in from out of town and then meet at the same coffee shop multiple times within a timeframe 404 may be much more indicative of a relationship involving those people. It is therefore possible to have different weights for the same types of feature values, where those weights may be dependent on other factors. The same or similar types of weighting adjustments may be used for any of the features of the collocation events described above, where the weights can vary based on other factors not necessarily captured by those features themselves. In addition to or in lieu of weighting different values of the same feature differently depending on the circumstances, separate features may be used to differentiate the colocation events described above, such as when one or more other features consider the distance(s) traveled by one or more entities to a collocation event and/or the distance(s) traveled by one or more entities following a collocation event.

Figure 8:
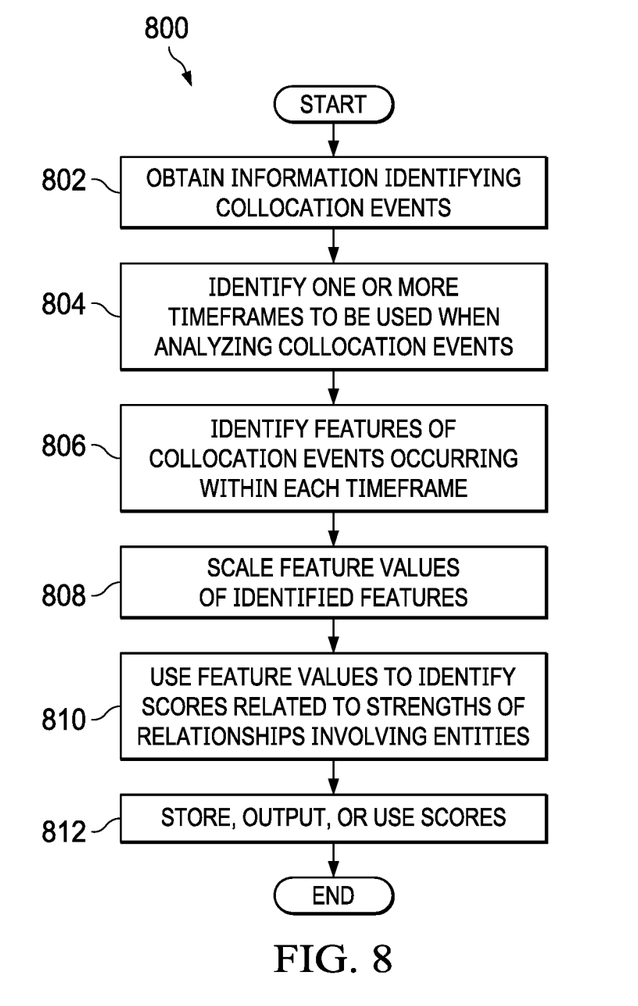
FIG. 8 illustrates an example method for entity relation strength identification using spatiotemporal data according to this disclosure.

FIG. 8 illustrates an example method 800 for entity relation strength identification using spatiotemporal data according to this disclosure. For ease of explanation, the method 800 shown in FIG. 8 is described as being performed using the application server 106 in the system 100 shown in FIG. 1, where the application server 106 may be implemented using one or more instances of the device 200 shown in FIG. 2. As a particular example, the method 800 shown in FIG. 8 may be performed as part of the data processing operations 306 within the architecture 300 shown in FIG. 3. However, the method 800 shown in FIG. 8 could be performed using any other suitable device(s) and in any other suitable system(s).

As shown in FIG. 8, information identifying collocation events is obtained at step 802. This may include, for example, the processing device 202 of the application server 106 obtaining information from one or more data sources 116a-116n, where the information may represent collocation events involving any number of entities. One or more timeframes to be used when analyzing the collocation events are identified at step 804. This may include, for example, the processing device 202 of the application server 106 identifying one or more timeframes 404 to be used when processing the collocation events.

Features of the collocation events occurring within each timeframe are identified at step 806. This may include, for example, the processing device 202 of the application server 106 processing the input data 402 to identify values 502 of features 406 associated with the collocation events. As a particular example, this may include the processing device 202 of the application server 106 processing the input data 402 to identify count, entity distance, and duration features for different pairs or groups of entities associated with the collocation events. The feature values of the features can be scaled at step 808. This may include, for example, the processing device 202 of the application server 106 processing the feature values 502 of various features 406 in order to (among other things) scale the feature values 502 to a common scale and produce scaled feature values 504 for those features 406.

The feature values are used to identify scores related to the strengths of relationships involving entities at step 810. This may include, for example, the processing device 202 of the application server 106 weighting the feature values 502 or 504 differently and combining or otherwise processing the weighted feature values, providing the feature values 502 or 504 as inputs to one or more machine learning models 608, analyzing the feature values 502 or 504 using one or more statistical techniques, or processing the feature values 502 or 504 in any other suitable manner to produce the final scores 606. The final scores 606 can be used as indicators of whether relationships exist involving certain entities and the strengths of those relationships.

The scores may be stored, output, or used in some manner at step 812. This may include, for example, the processing device 202 of the application server 106 including one or more of the final scores 606 in a graphical user interface or report. This may also or alternatively include providing at least one of the final scores 606 to a downstream processing task, such as a task that identifies the key or strongest entity relationship(s) associated with a specific entity. This may also or alternatively include storing the final scores 606 in the database 110 for further processing. In general, the final scores 606 or other indicators of relationship strengths may be used in any suitable manner.

Although FIG. 8 illustrates one example of a method 800 for entity relation strength identification using spatiotemporal data, various changes may be made to FIG. 8. For example, while shown as a series of steps, various steps in FIG. 8 may overlap, occur in parallel, occur in a different order, or occur any number of times. As a particular example, various steps may be repeated over time to calculate multiple scores for the same entities over time. Also, as noted above, some embodiments of this disclosure may process input data 402 directly, process feature values 502 without scaling, or otherwise process data to identify relationship strengths, in which case various steps in FIG. 8 may be omitted or altered.

Note that while it may be assumed in some instances above that the described approaches are being used to identify relationships and relationship strengths involving different people, the same or similar types of processing may be performed to identify relationships and relationship strengths involving different groups or other collections of people. For example, it is possible to identify relationships and relationship strengths involving different individuals, identify individuals associated with different groups, and combine the final scores associated with any relationships involving people of different groups. This could be done to provide indications of the strengths of relationships involving the different groups.

The following describes example embodiments of this disclosure that implement entity relation strength identification using spatiotemporal data. However, other embodiments may be used in accordance with the teachings of this disclosure.

In a first embodiment, a method includes obtaining information associated with multiple collocation events. Each collocation event is associated with an occurrence where multiple entities were collocated with one another. The information associated with each collocation event identifies the entities associated with the collocation event, a duration of the collocation event, one or more locations associated with the collocation event, and a time associated with the collocation event. The method also includes identifying strengths of different relationships involving different ones of the entities based on the information. The strengths are determined using one or more features of the collocation events.

In a second embodiment, an apparatus includes at least one processing device configured to obtain information associated with multiple collocation events. Each collocation event is associated with an occurrence where multiple entities were collocated with one another. The information associated with each collocation event identifies the entities associated with the collocation event, a duration of the collocation event, one or more locations associated with the collocation event, and a time associated with the collocation event. The at least one processing device is also configured to identify strengths of different relationships involving different ones of the entities based on the information. The strengths are based on one or more features of the collocation events.

In a third embodiment, a non-transitory computer readable medium stores computer readable program code that when executed causes one or more processors to obtain information associated with multiple collocation events. Each collocation event is associated with an occurrence where multiple entities were collocated with one another. The information associated with each collocation event identifies the entities associated with the collocation event, a duration of the collocation event, one or more locations associated with the collocation event, and a time associated with the collocation event. The medium also stores computer readable program code that when executed causes the one or more processors to identify strengths of different relationships involving different ones of the entities based on the information. The strengths are based on one or more features of the collocation events.

Any single one or any suitable combination of the following features may be used with the first, second, or third embodiment. The one or more features of the collocation events may include one or more of (i) one or more count features associated with one or more frequencies or numbers of collocation events involving specified ones of the entities, (ii) one or more distance features associated with one or more distances between or among the specified entities during the collocation events, and (iii) one or more duration features associated with one or more lengths of collocation involving the specified entities during the collocation events. The one or more features of the collocation events may be identified for each of one or more timeframes, and the strengths of the different relationships may be determined using or may be based on the one or more features of the collocation events during the one or more timeframes. Feature values of at least one of the one or more features may be scaled, and the strengths of the different relationships may be determined using or may be based on the scaled feature values of the at least one of the one or more features. The feature values of the at least one of the one or more features may be scaled such that the feature values of all features span a common range of values. A first one of the one or more features may use lower values to identify weaker associations involving entities and higher values to identify stronger associations involving entities, a second one of the one or more features may use lower values to identify stronger associations involving entities and higher values to identify weaker associations involving entities, and one of the first and second features may be scaled to reverse the values representing stronger and weaker associations involving entities. The strengths of the different relationships may be identified by (i) for each relationship, determining an aggregation of feature values associated with the entities involved in that relationship, (ii) using at least one machine learning model trained to identify the strengths of the relationships, and/or (iii) using one or more statistical calculations to identify the strengths of the relationships. The strengths of the different relationships may be identified by, for each relationship, determining an aggregation of feature values associated with the entities involved in that relationship, where unequal weights are associated with the feature values of each of at least one of the one or more features of the collocation events. At least one of the one or more features may be associated with distances traveled by entities to or from collocation events.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrases "at least one of" and "one or more of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:

obtaining information associated with multiple collocation events from multiple data sources, wherein each collocation event is associated with an occurrence where multiple entities were collocated with one another;

pre-processing the information from the multiple data sources into a unified data format using a first machine learning model, the unified data format defining:
the multiple entities associated with a collocation event;
a duration of the collocation event;
one or more locations associated with the collocation event; and
a time associated with the collocation event;

determining, by a second machine learning model, multiple features of the multiple collocation events using the information in the unified data format, wherein the second machine learning model is distinct from the first machine learning model;

providing the multiple determined features of the multiple collocation events to a third machine learning model, wherein the third machine learning model is distinct from the first machine learning model and the second machine learning model; and identifying strengths of different relationships involving different ones of the multiple entities using the third machine learning model based on the multiple determined features of the multiple collocation events;

wherein the third machine learning model is trained to identify, using the information in the unified data format, the strengths of the different relationships by generating scores based on the multiple determined features of the multiple collocation events.

2. The method of claim 1, wherein the multiple determined features of the multiple collocation events comprise:
one or more count features associated with one or more frequencies or numbers of collocation events involving specified entities of the multiple entities;
one or more distance features associated with one or more distances between or among the specified entities during the multiple collocation events; and
one or more duration features associated with one or more lengths of collocation involving the specified entities during the multiple collocation events.

3. The method of claim 2, wherein:
the multiple determined features of the multiple collocation events are determined for each of multiple timeframes; and
the strengths of the different relationships are determined using the multiple determined features of the multiple collocation events during the multiple timeframes.

4. The method of claim 1, further comprising:
scaling feature values of at least one of the multiple determined features to generate scaled features of the at least one of the multiple determined features;
wherein the strengths of the different relationships are determined using the scaled feature values of the at least one of the multiple determined features.

5. The method of claim 4, wherein the scaled feature values of all of the determined features span a common range of values.

6. The method of claim 4, wherein:
a first determined feature of the multiple determined features uses values below a first threshold to identify weaker associations involving the multiple entities and values above the first threshold to identify stronger associations involving the multiple entities, wherein a strength of an association reflects a quantification of a grouping of entities of the multiple entities;
a second determined feature of the multiple determined features uses values below a second threshold to identify the stronger associations involving the multiple entities and values above the second threshold to identify the weaker associations involving the multiple entities; and
scaling the feature values comprises scaling the feature values of the first determined feature or the second determined feature to reverse values representing the stronger associations involving the multiple entities and the weaker associations involving the multiple entities.

7. The method of claim 1, wherein identifying the strengths of the different relationships comprises, for each of the different relationships, determining an aggregation of feature values associated with entities among multiple entities involved in a relationship.

8. The method of claim 1, wherein the second machine learning model is trained during unsupervised learning to perform anomaly detection.

9. The method of claim 1, wherein identifying the strengths of the different relationships comprises using one or more statistical calculations to identify the strengths of the different relationships.

10. The method of claim 1, wherein the second machine learning model is trained during semi-supervised or supervised learning using labeled training data.

11. The method of claim 1, wherein:
identifying the strengths of the different relationships comprises, for each of the different relationships, determining an aggregation of feature values associated with multiple entities involved in a relationship; and
unequal weights are associated with feature values of each determined feature of the multiple collocation events.

12. The method of claim 11, wherein:
the multiple collocation events comprise meetings between a plurality of entities at a specific location;
the feature values include feature values associated with a frequency at which the meetings at the specific location occur;
the feature values associated with the frequency at which the meetings at the specific location occur have unequal weights; and
the unequal weights are based on different distances that different entities of the plurality of entities traveled to the specific location.

13. The method of claim 1, wherein at least one of the multiple determined features is associated with distances traveled by one or more of the multiple entities to or from one or more of the multiple collocation events.

14. An apparatus comprising:
at least one processing device configured to:
obtain information associated with multiple collocation events from multiple data sources, wherein each collocation event is associated with an occurrence where multiple entities were collocated with one another;
pre-process the information from the multiple data sources into a unified data format using a first machine learning model, the unified data format defining:
the multiple entities associated with a collocation event;

a duration of the collocation event;
one or more locations associated with the collocation event; and
a time associated with the collocation event;
determine, by a second machine learning model, multiple features of the multiple collocation events using the information in the unified data format, wherein the second machine learning model is distinct from the first machine learning model;
provide the multiple determined features of the multiple collocation events to a third machine learning model, wherein the third machine learning model is distinct from the first machine learning model and the second machine learning model; and
identify strengths of different relationships involving different ones of the multiple entities using the third machine learning model based on the multiple determined features of the multiple collocation events;
wherein the third machine learning model is trained to identify, using the information in the unified data format, the strengths of the different relationships by generating scores based on the multiple determined features of the multiple collocation events.

15. The apparatus of claim 14, wherein the multiple determined features of the multiple collocation events comprise:
one or more count features associated with one or more frequencies or numbers of collocation events involving specified entities of the multiple entities;
one or more distance features associated with one or more distances between or among the specified entities during the multiple collocation events; and
one or more duration features associated with one or more lengths of collocation involving the specified entities during the multiple collocation events.

16. The apparatus of claim 15, wherein:
the at least one processing device is configured to determine the multiple determined features of the multiple collocation events for each of multiple timeframes; and
the at least one processing device is configured to determine the strengths of the different relationships using the multiple determined features of the multiple collocation events during the multiple timeframes.

17. The apparatus of claim 14, wherein:
the at least one processing device is further configured to scale feature values of at least one of the multiple determined features to generate scaled features of the at least one of the multiple determined features; and
the at least one processing device is configured to determine the strengths of the different relationships using the scaled feature values of the at least one of the multiple determined features.

18. The apparatus of claim 17, wherein the scaled feature values of all of the determined features span a common range of values.

19. The apparatus of claim 17, wherein:
a first determined feature of the multiple determined features uses values below a first threshold to identify weaker associations involving the multiple entities and values above the first threshold to identify stronger associations involving the multiple entities, wherein a strength of an association reflects a quantification of a grouping of entities of the multiple entities;
a second determined feature of the multiple determined features uses values below a second threshold to identify the stronger associations involving the multiple entities and values above the second threshold to identify the weaker associations involving the multiple entities; and
the at least one processing device is configured to scale the feature values of the first determined feature or the second determined feature to reverse values representing the stronger associations involving the multiple entities and the weaker associations involving the multiple entities.

20. The apparatus of claim 14, wherein, to identify the strengths of the different relationships, the at least one processing device is configured, for each of the different relationships, to determine an aggregation of feature values associated with entities among multiple entities involved in a relationship.

21. The apparatus of claim 14, wherein the second machine learning model is trained during semi-supervised or supervised learning using labeled training data.

22. The apparatus of claim 14, wherein the second machine learning model is trained during unsupervised learning to perform anomaly detection.

23. The apparatus of claim 14, wherein:
to identify the strengths of the different relationships, the at least one processing device is configured, for each of the different relationships, to determine an aggregation of feature values associated with multiple entities involved in a relationship; and
unequal weights are associated with feature values of each determined feature of the multiple collocation events.

24. The apparatus of claim 14, wherein at least one of the multiple determined features is associated with distances traveled by one or more of the multiple entities to or from one or more of the multiple collocation events.

25. The apparatus of claim 14, wherein the at least one processing device is configured to use one or more statistical calculations to identify the strengths of the different relationships.

26. A non-transitory computer readable medium storing computer readable program code that when executed causes one or more processors to:
obtain information associated with multiple collocation events from multiple data sources, wherein each collocation event is associated with an occurrence where multiple entities were collocated with one another;
pre-process the information from the multiple data sources into a unified data format using a first machine learning model, the unified data format defining, for each collocation event:
the multiple entities associated a the collocation event;
a duration of the collocation event;
one or more locations associated with the collocation event; and
a time associated with the collocation event;
determine, by a second machine learning model, multiple features of the multiple collocation events using the information in the unified data format, wherein the second machine learning model is distinct from the first machine learning model;
provide the multiple determined features of the multiple collocation events to a third machine learning model, wherein the third machine learning model is distinct from the first machine learning model and the second machine learning model; and
identify strengths of different relationships involving different ones of the multiple entities using the third machine learning model based on the multiple determined features of the multiple collocation events;

wherein the third machine learning model is trained to identify, using the information in the unified data format, the strengths of the different relationships by generating scores based on the multiple determined features of the multiple collocation events.

27. The non-transitory computer readable medium of claim 26, wherein the multiple determined features of the multiple collocation events comprise:
one or more count features associated with one or more frequencies or numbers of collocation events involving specified entities of the multiple entities;
one or more distance features associated with one or more distances between or among the specified entities during the multiple collocation events; and
one or more duration features associated with one or more lengths of collocation involving the specified entities during the multiple collocation events.

28. The non-transitory computer readable medium of claim 27, wherein:
the computer readable program code when executed causes the one or more processors to determine the multiple determined features of the multiple collocation events for each of multiple timeframes; and
the strengths of the different relationships are based on the multiple determined features of the multiple collocation events during the multiple timeframes.

29. The non-transitory computer readable medium of claim 26, wherein:
the non-transitory computer readable medium further stores computer readable program code that when executed causes the one or more processors to scale feature values of at least one of the multiple determined features to generate scaled features of the at least one of the multiple determined features; and
the strengths of the different relationships are based on the scaled feature values of the at least one of the multiple determined features.

30. The non-transitory computer readable medium of claim 29, wherein the scaled feature values of all of the determined features span a common range of values.

31. The non-transitory computer readable medium of claim 29, wherein:
a first determined feature of the multiple determined features uses values below a first threshold to identify weaker associations involving the multiple entities and values above the first threshold to identify stronger associations involving the multiple entities, wherein a strength of an association reflects a quantification of a grouping of entities of the multiple entities;
a second determined feature of the multiple determined features uses values below a second threshold to identify the stronger associations involving the multiple entities and values above the second threshold to identify the weaker associations involving the multiple entities; and the computer readable program code that when executed causes the one or more processors to scale the feature values comprises:
computer readable program code that when executed causes the one or more processors to scale the feature values of the first determined feature or the second determined feature to reverse values representing the stronger associations involving the multiple entities and the weaker associations involving the multiple entities.

32. The non-transitory computer readable medium of claim 26, wherein the computer readable program code that when executed causes the one or more processors to identify the strengths of the different relationships comprises:
computer readable program code that when executed causes the one or more processors, for each of the different relationships, to determine an aggregation of feature values associated with entities among multiple entities involved in a relationship.

33. The non-transitory computer readable medium of claim 26, wherein:
the computer readable program code that when executed causes the one or more processors to identify the strengths of the different relationships comprises:
computer readable program code that when executed causes the one or more processors, for each of the different relationships, determine an aggregation of feature values associated with multiple entities involved in a relationship; and
unequal weights are associated with feature values of each determined feature of the multiple collocation events.

34. The non-transitory computer readable medium of claim 26, wherein at least one of the multiple determined features is associated with distances traveled by one or more of the multiple entities to or from one or more of the multiple collocation events.

35. The non-transitory computer readable medium of claim 26, wherein the second machine learning model is trained during semi-supervised or supervised learning using labeled training data.

36. The non-transitory computer readable medium of claim 26, wherein the second machine learning model is trained during unsupervised learning to perform anomaly detection.

37. The non-transitory computer readable medium of claim 26, wherein the computer readable program code that when executed causes the one or more processors to identify the strengths of the different relationships comprises:
computer readable program code that when executed causes the one or more processors to use one or more statistical calculations to identify the strengths of the different relationships.

* * * * *